M. V. B. RULAND.
WIRE HOISTING BRIDLE.
APPLICATION FILED DEC. 9, 1912.
1,063,738.
Patented June 3, 1913.
Fig. 1,
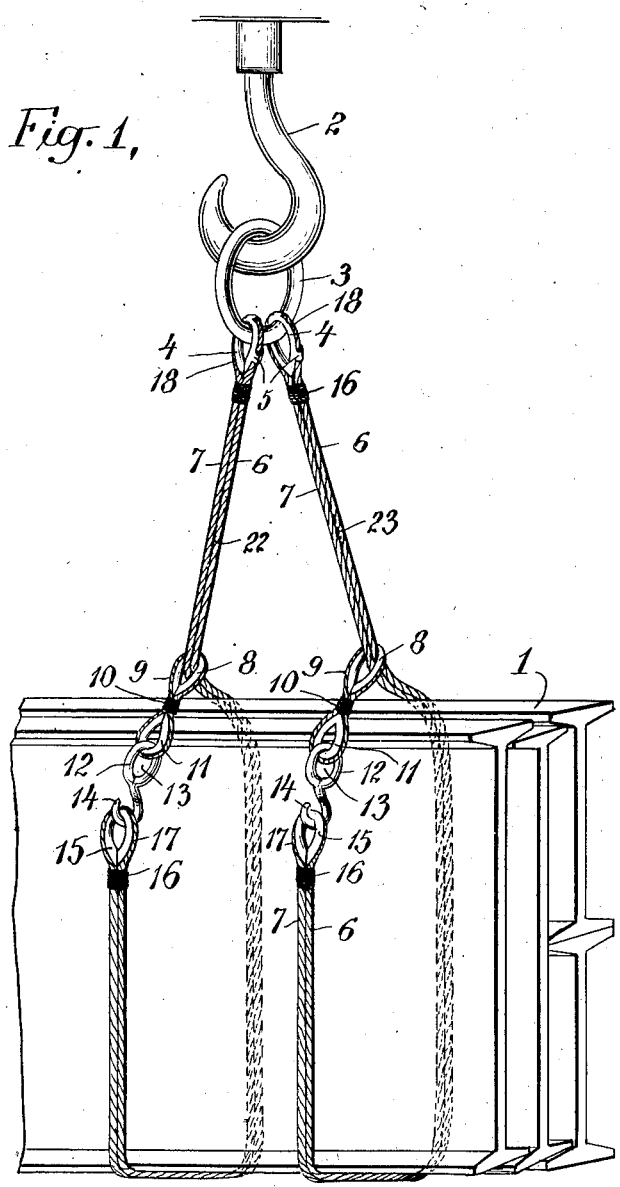
Fig. 2,
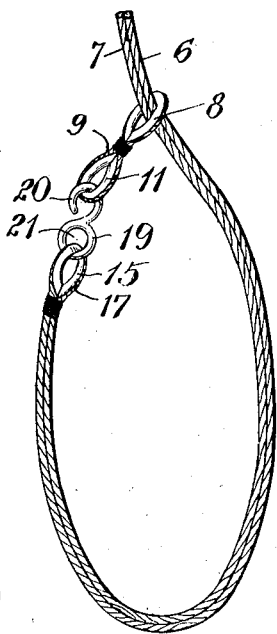
WITNESSES
Albert E. Thayer
Jessie B. Kay.
INVENTOR
Martin V B Ruland
BY
Duncan & Duncan ATTORNEYS

UNITED STATES PATENT OFFICE.

MARTIN V. B. RULAND, OF BROOKLYN, NEW YORK.

WIRE HOISTING-BRIDLE.

1,063,738.  Specification of Letters Patent.  Patented June 3, 1913.

Application filed December 9, 1912. Serial No. 735,596.

*To all whom it may concern:*

Be it known that I, MARTIN V. B. RULAND, a citizen of the United States, and resident of the borough of Brooklyn, county of Kings, and State of New York, have made a certain new and useful Invention Relating to Wire Hoisting-Bridles, of which the following is a specification, taken in connection with the accompanying drawing, which forms part of the same.

This invention relates especially to wire rope hoisting devices or bridles which may comprise a rigid support ring having one or more wire rope gromet slings permanently connected thereto, running connections loosely mounted on said slings and fastening devices coöperating with said running connections and with the free ends of said slings to pass around and grip the load and tighten thereon under hoisting conditions.

In the accompanying drawing showing in a somewhat diagrammatic way several illustrative embodiments of this invention, Figure 1 is an elevation of one form; and Fig. 2 is a partial elevation showing another arrangement.

These hoisting devices or bridles preferably comprise wire rope slings and to secure still greater reliability the wire rope elements are preferably in the form of gromets, each formed as by unlaying or untwisting a long wire rope into its separate strands, and then taking one of these strands and forming a ring or loop of its middle portion and twisting or laying its ends around this entire loop six times or so and tucking in the ends of the strand; so as to still further minimize spliced or other connections. The bridle may if desired comprise a suitable support adapted to coöperate with the hoisting device such as the usual hoisting block hook 2 and this support may be in the form of a substantially rigid ring 3 so as to be readily attached to the hook or disconnected therefrom. The hoisting device may comprise one or more wire rope slings which may if desired be permanently connected to the support, so that the slings may detachably engage the load and firmly hold it during the hoisting operation. These slings, such as 22, 23 may be formed of wire rope gromets, the sling 22 for instance having the two gromet members 6, 7 held side by side at either end as by seizing, lacing or the like so as to form a loop 18 which is preferably provided with a suitable reinforcing thimble 4 of heavy cast steel or other suitable material and preferably provided with the securing members or lugs 5 thereon to embrace the adjacent wire loop. These slings may be provided with any desired fastening device to detachably connect them to the load and the fastening device preferably comprises a suitable running connection loosely mounted on the sling to automatically tighten on the load under hoisting conditions and more securely grip the same. The running connection may be in the form of a wire rope gromet 9 looped around the sling 22 for instance so as to be permanently mounted thereon. The running connection may be provided with a reinforcing or lining thimble 8 preferably of soft steel or other material to minimize wear on the sling which may be held as by a seizing 10 adjacent the loop. The fastening device which preferably coöperates with the running connection and with a fastening member or loop, one or more of which may be formed on the sling adjacent its free end for instance, may be in the form of a fastener or hook 12 having its eye 13 permanently connected to the running connection 9 by being engaged by the loop therein which may be formed with the reinforcing thimble 11, the hook being preferably so arranged as to have the point 14 of the hook normally extending upward as the bridle is used. This upstanding hook is thus in position to be readily hooked into the terminal fastening or eye 17 which may be formed at the end of the sling and provided with a thimble 15 and seizing 16. In this way the bridle may be very readily applied to a load by passing the end of each sling around the load 1 of I-beams for instance and hooking the terminal loop over the upstanding hook on the running connection. Each wire rope sling thus has a slip noose grip on the load preferably at considerably separated points so that as the load is hoisted the grip of the slings increases, the running connections passing freely down the wire rope slings so as to take up all slack possible which is facilitated by the absence of any projections on the slings. Under these circumstances the slings have such a tight grip on the load that even if one of the slings should break the other would still grip the load so tightly as to prevent its disintegrating or falling. The fastening device may in some cases as indicated in Fig. 2 comprise a fastener or hook 19 having its eye 21 permanently secured to the fastening member or loop 17 at the end of the sling so as to have its end 20 hooked into a loop on the running connection 9 and secure an automatically tightening grip on the 'oad in a similar manner This invention has been described in connection with a number of illustrative embodiments, forms, proportions, materials, arrangements and numbers of parts, to the details of which disclosure the invention is not of course to be limited, since what is claimed as new and what is desired to be secured by Letters Patent is set forth in the appended claims.

I claim—

1. The hoisting bridle comprising a rigid ring support, two wire rope gromet slings permanently connected to said support by integral loops formed in said slings, reinforcing thimbles in said loops and provided with gripping lugs engaging the adjacent wire of the loops, a running connection loosely mounted on each of said slings and comprising a wire rope gromet looped around said sling and provided with a soft metal reinforcing thimble and a fastening device coöperating with said running connection and with the free end of said sling and comprising a hook permanently secured to said running connection to have its hooked end upstanding and coöperate with a terminal fastening loop on the sling provided with a reinforcing thimble.

2. The hoisting bridle comprising a ring support, two wire rope gromet slings permanently connected to said support by integral loops formed in said slings, a running connection loosely mounted on each of said slings and comprising a wire rope gromet looped around said sling and a fastening device coöperating with said running connection and with the free end of said sling and comprising a hook permanently secured to said running connection to have its hooked end upstanding and coöperate with a terminal fastening loop on the sling provided with a reinforcing thimble.

3. The hoisting bridle comprising a support, two wire rope gromet slings permanently connected to said support by integral loops formed in said slings, a running connection loosely mounted on each of said slings and comprising a wire rope gromet looped around said sling and a fastening device coöperating with said running connection and with the free end of said sling and comprising a hook permanently secured to said running connection to have its hooked end coöperate with a fastening on the sling.

4. The hoisting bridle comprising a support, two wire rope gromet slings permanently connected to said support by integral loops formed in said slings, a running connection loosely mounted on each of said slings and a fastening device coöperating with said running connection and with said sling and permanently secured to said running connection.

5. The hoisting bridle comprising a support, a plurality of wire rope gromet slings permanently connected to said support by integral loops formed in said slings, a wire rope running connection loosely mounted on each of said slings and comprising a gromet looped around said sling and provided with a thimble and a fastening device coöperating with said running connection and with the free end of said sling and comprising a hook permanently secured to said running connection to have its hooked end upstanding and coöperate with a terminal fastening loop on the sling.

6. The hoisting bridle comprising a support, a plurality of wire rope slings permanently connected to said support, a wire rope running connection loosely mounted on each of said slings and looped around said sling and a fastening device coöperating with said running connection and with the free end of said sling and comprising a hook permanently secured to said running connection.

7. The hoisting bridle comprising a support, a plurality of wire rope slings permanently connected to said support, a running connection loosely mounted on each of said slings and a fastening device coöperating with said running connection and with the free end of said sling and permanently secured to said running connection.

8. The hoisting bridle comprising a wire rope gromet sling formed with an integral loop formed in said sling and a reinforcing thimble in said loop, a running connection loosely mounted on said sling and comprising a wire rope gromet looped around said sling and a fastening device coöperating with said running connection and with the free end of said sling and comprising a hook permanently secured to said running connection to have its hooked end normally upstanding and coöperate with a terminal fastening loop on said sling.

9. The hoisting bridle comprising a wire rope sling, a running connection loosely mounted on said sling and a fastening device coöperating with said running connection and with the free end of said sling and comprising a hook permanently secured to said running connection to coöperate with a terminal fastening loop on said sling.

10. The detachable hoisting device comprising a wire rope gromet sling and a fastening device comprising a hook permanently connected to said sling and comprising a loose running connection coöperating with said sling to form an automatically tightening gripping loop in said sling under hoisting conditions.

11. The hoisting device comprising a wire rope gromet sling and a detachable fastening device permanently connected to said sling to form an automatically tightening gripping loop in said sling under hoisting conditions.

12. The hoisting device comprising a wire rope gromet sling formed with an integral loop in said sling, a running connection loosely mounted on said sling and comprising a wire rope gromet looped around said sling and a fastening device coöperating with said running connection and with said sling.

13. The hoisting device comprising a support, a plurality of gromet wire rope slings permanently connected to said support, a running connection loosely mounted on each of said slings and a detachable fastening device coöperating with said running connection and with the free end of said sling.

14. The hoisting device comprising a support, a plurality of gromet wire rope slings permanently connected to said support, a running connection loosely mounted on each of said slings and comprising a gromet looped around said sling, and a detachable fastening device coöperating with said running connection and with the free end of said sling.

15. The hoisting device comprising a wire rope sling and a detachable fastening device comprising a hook permanently connected to said sling and comprising a wire rope gromet looped around said sling and forming a running connection coöperating with said sling to constitute an automatically tightening gripping loop in said sling under hoisting conditions.

16. The hoisting device comprising a wire rope sling and a detachable fastening device comprising a hook permanently connected to said sling and comprising a running connection coöperating with said sling to constitute an automatically tightening gripping loop in said sling under hoisting conditions.

MARTIN V. B. RULAND.

Witnesses:
  HARRY L. DUNCAN,
  JESSIE B. KAY.